United States Patent [19]

Fukui et al.

[11] 4,363,885

[45] Dec. 14, 1982

[54] PROPYLENE POLYMER COMPOSITION USEFUL FOR BUMPERS

[75] Inventors: Osamu Fukui, Toyonaka; Yoshiro Umemoto, Nagoya; Tsugumi Sanmiya, Toyota; Yutaka Sano, Kishiwada; Kazuyoshi Tanaka, Sakai, all of Japan

[73] Assignees: UBE Industries, Ltd., Yamaguchi; Toyota Jidosha Kigyo Kabushiki Kaisha, Aichi, both of Japan

[21] Appl. No.: 276,972

[22] Filed: Jun. 24, 1981

[30] Foreign Application Priority Data

Sep. 22, 1980 [JP] Japan ............................... 55/130748

[51] Int. Cl.$^3$ .......................... C08K 3/34; C08L 53/00
[52] U.S. Cl. .................................. 523/212; 523/203; 523/216; 524/91; 524/100; 524/143; 524/248; 524/291; 524/305; 524/323; 524/359; 524/371; 524/378; 524/384; 524/394; 524/396; 524/409; 524/411; 524/413; 524/451; 524/505; 525/88; 525/89
[58] Field of Search ...................... 525/88, 89; 260/42, 260/46; 524/451, 409, 248, 411, 91, 371, 384, 143, 323, 359, 291, 100, 505, 305, 394, 378, 395, 413; 523/203, 212, 216

[56] References Cited

U.S. PATENT DOCUMENTS

| | | | |
|---|---|---|---|
| 3,328,486 | 6/1967 | Crawford et al. | 525/88 |
| 3,487,128 | 12/1969 | Okazaki et al. | 525/88 |
| 3,906,056 | 9/1975 | Okamoto et al. | 525/88 |
| 4,153,587 | 5/1979 | Yui | 525/88 |

FOREIGN PATENT DOCUMENTS 9276 4/1950 European Pat. Off. .
1557376 12/1979 United Kingdom .

OTHER PUBLICATIONS

Derwent Abst. 02892 Y/02, Mitsui Toatsu (11-26-76), "Thermoplastic Resin Compsus . . . ".
Derwent Abs. 24782 C/14 Stamicarbon BV (3-18-80), "High Impact Talc-Filled . . . ".
Derwent 06645 D/05 Idemitsu (11-25-80), "Propylene Copolymer Resin . . . ".
Derwent Abst. 50902 A/28 Toyoda Gosei (6-8-78) "Low Temp Impact Resist . . . ".

*Primary Examiner*—Paul Lieberman
*Assistant Examiner*—Herbert J. Lilling
*Attorney, Agent, or Firm*—Burgess, Ryan and Wayne

[57] ABSTRACT

A bumper having excellent rigidity, resistance to thermal deformation and to mechanical impact at a low temperature and superior lacquer-bonding property is made from a propylene polymer composition comprising:

(A) 55 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane, in an amount of 97% or more, in which a fraction thereof soluble in p-xylene at room temperature, has an intrinsic viscosity of from 3 to 4 determined in decahydronaphthalene at a temperature of 135° C. and which has a melt flow index of from 2 to 10;

(B) 30 to 35% by weight of at least one amorphous ethylene-propylene copolymer having an intrinsic viscosity of from 2.0 to 3.5 determined in decahydronaphthalene at a temperature of 135° C., and a Mooney viscosity $ML_{1+4}$ of from 40 to 100 determined at a temperature of 100° C., and;

(C) 5 to 15% by weight of talc in the form of fine particles having an average size of from 0.5 to 5 microns.

11 Claims, No Drawings

PROPYLENE POLYMER COMPOSITION USEFUL FOR BUMPERS

FIELD OF THE INVENTION

The present invention relates to a propylene polymer composition. More particularly, the present invention relates to a propylene polymer composition useful for producing bumpers having an excellent lacquer-bonding property and resistance to mechanical impact.

BACKGROUND OF THE INVENTION

Hitherto, the bumpers of cars have usually been made of a steel sheet. However, steel bumpers are undesirably heavy and have poor impact-relieving property. Accordingly, in order to eliminate the above-mentioned disadvantages, the production of a new type of bumper, exhibiting an enhanced safety and a decreased weight, by using a polyurethane resin in place of the steel sheet has been attempted. However, the lightness in weight of the resultant polyurethane resin bumper was still unsatisfactory and the polyurethane resin, which was expensive, caused the resultant bumper to be undesirably expensive. Therefore, it was desired to find a material useful for making the bumpers having a satisfactory low price and light weight.

Under these circumstances, crystalline ethylene-propylene copolymers were expected to be a material useful for making cheap and light bumpers.

Generally, it is known that conventional crystalline ethylene-propylene block copolymers, adequate for injection molding processes, exhibit an excellent rigidity and satisfactory resistance to thermal deformation and surface hardness. However, it is also known that the conventional crystalline ethylene-propylene block copolymers exhibit a poor lacquer-bonding property and a poor resistance to mechanical impact applied thereto at a low temperature of, for instance, about $-30°$ C. Therefore, it was found that the conventional crystalline ethylene-propylene block copolymers were unsatisfactory as a material for making bumpers having all the properties of excellent rigidity, satisfactory resistance to thermal deformation, resistance to mechanical impact at a low temperature and capable of good lacquer-bonding.

In order to enhance the resistance to mechanical impact at a low temperature and to enhance the lacquer-bonding property of the crystalline ethylene-propylene block copolymers, it was attempted to blend the conventional crystalline ethylene propylene block copolymer with an amorphous ethylene-propylene copolymer alone or a mixture of the amorphous ethylene-propylene copolymer with various types of polyethylene.

However, in this attempt, it was found that the above-mentioned modes of blends caused the resultant copolymer blends to exhibit lower rigidity and resistance to thermal deformation than those of the crystalline ethylene-propylene block copolymers. That is, it failed to provide bumpers having an excellent rigidity and resistance to mechanical impact by using the conventional crystalline ethylene-propylene block copolymers and amorphous ethylene-propylene copolymers.

SUMMARY OF THE INVENTION

The object of the present invention is to provide a propylene polymer composition useful for making bumpers having an excellent rigidity and resistance to mechanical impact at a low temperature together with a satisfactory resistance to thermal deformation and an enhanced lacquer-bonding property.

The above-mentioned object can be attained by the propylene polymer composition of the present invention, which comprises:

(A) 55 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane, in an amount of 97% or more based on the weight of said polypropylene component, in which a fraction therof, soluble in p-xylene at room temperature, has an intrinsic viscosity of from 3 to 4 determined in decahydronaphthalene at a temperature of 135° C. and which has a melt flow index of from 2 to 10;

(B) 30 to 35% by weight of at least one amorphous ethylene-propylene copolymer having an intrinsic viscosity of from 2.0 to 3.5 determined in decahydronaphthalene at a temperature of 135° C., and a Mooney viscosity $ML_{1+4}$ of from 40 to 100 determined at a temperature of 100° C., and;

(C) 5 to 15% by weight of talc in the form of fine particles having an average size of from 0.5 to 5 microns.

DETAILED DESCRIPTION OF THE INVENTION

The propylene polymer composition of the present invention can provide bumpers having a modulus of elasticity in bending of 8000 kg/cm² or more, an Izot impact strength of 30 kg·/cm/cm or more and lacquer-retaining percentage of 100 in the cross cut test. That is, bumpers made of the propylene polymer composition of the present invention exhibit a significantly enhanced resistance to mechanical impact at a low temperature and a superior lacquer-bonding property while exhibiting the same level of rigidity and resistance to thermal deformation as those of other bumpers made of the conventional crystalline ethylene-propylene block copolymer alone.

In the propylene polymer composition of the present invention, at least one crystalline ethylene-propylene block copolymer is used in an amount of from 55 to 65% by weight. That is, the crystalline block copolymer may be used in one single phase or in the form of a mixture of two or more copolymers, as long as the total content of the two or more copolymers is in the range of 55 to 65% by weight.

If the content of the crystalline block copolymer is less than 55% by weight, the resultant propylene polymer composition imparts a shaped article made therefrom, having an unsatisfactory modulus of elasticity in bending of less than 8000 kg/cm². The content of the crystalline block copolymer of more than 65% by weight causes a shaped article made from the resultant propylene polymer composition to exhibit an unsatisfactory Izot impact strength of less than 30 kg·/cm/cm at a temperature of $-30°$ C.

In the crystalline ethylene-propylene block copolymer used for the present invention, the content of polymerized ethylene is in the range of from 5 to 10% by weight, the polypropylene component contains a fraction thereof insoluble in boiling n-heptane, in an amount of 97% by weight or more, and a fraction of the block copolymer soluble in p-xylene at room temperature exhibits an intrinsic viscosity of from 3 to 4 determined in decahydronaphthalene at a temperature of 135° C. Also, the block copolymer exhibits a melt flow index of from 2 to 10.

The term "a fraction of the polypropylene component insoluble in boiling n-heptane" used herein, refers to a fraction in the polypropylene (matrix) component used for preparing the crystalline ethylene-propylene block copolymer, which fraction is insoluble in boiling n-heptane. In the present invention, it is necessary that the content of the boiling n-heptane-insoluble fraction in the polypropylene component is 97% by weight or more. If the content of the fraction is less than 97% by weight, the resultant propylene polymer composition causes a bumper made from the composition to exhibit an unsatisfactory modulus of elasticity in bending of less than 8000 kg/cm$^2$.

In the crystalline block copolymer, the fraction thereof soluble in p-xylene at an ambient temperature exhibits an intrinsic viscosity of 3 to 4 determined in decahydronaphthalene at 135° C. If the intrinsic viscosity of the p-xylene soluble fraction is less than 3, the resultant propylene polymer composition causes a shaped article made from the composition to exhibit an unsatisfactory Izot impact strength of less than 30 kg·cm/cm. Also, if the intrinsic viscosity of the p-xylene-soluble fraction is more than 4, the resultant propylene polymer composition causes a shaped article made therefrom to exhibit a poor lacquer-bonding property, that is, a lacquer-retaining percentage less than 100 in the cross cut test.

Also, the content of the polymerized ethylene in the crystalline block copolymer is in the range of from 5 to 10% by weight. If the content of ethylene is less than 5% by weight, the resultant propylene polymer composition causes a shaped article made therefrom to exhibit a poor lacquer-bonding property. Also, the content of ethylene of more than 10% by weight causes the shaped article to exhibit an unsatisfactory modulus of elasticity in bending.

The melt flow index of the crystalline block copolymer should be in the range of from 2 to 10. A melt flow index of less than 2 causes the resultant propylene polymer composition to exhibit a poor shaping property. Also, a melt flow index of more than 10 results in a poor resistance to impact of a shaped article made from the resultant propylene polymer composition.

The amorphous ethylene-propylene copolymer contained in the propylene polymer composition of the present invention has an intrinsic viscosity of from 2.0 to 3.5 determined in decahydronaphthalene at 135° C. and a Mooney viscosity $ML_{1+4}$ (100° C.) of from 40 to 100. The signal "$ML_{1+4}$ (100° C.)" refers to a Mooney viscosity measured by maintaining a material to be tested at a temperature of 100° C. for 4 minutes after preheating it to 100° C. for one minute and by using a Mooney Plastometer equiped with a large rotor.

When the amy viscosity $ML_{1+4}$ (100° C.) of from 40 to 100. The signal "$ML_{1+4}$ (100° C.)" refers to a Mooney viscosity measured by maintaining a material to be tested at a temperature of 100° C. for 4 minutes after preheating it to 100° C. for one minute and by using a Mooney Plastometer equiped with a large rotor.

When the amorphous copolymer has a melt flow index of less than 2.0, the crystalline copolymer phase is separated from the amorphous copolymer phase in the composition. This phase separation causes the resultant shaped article to exhibit an unsatisfactory regidity and resistance to impact at a low temperature. If the intrinsic viscosity is more than 3.5, the amorphous copolymer exhibits a poor compatibility with the crystalline copolymer and the resultant shaped article exhibits a poor lacquer-bonding property.

The content of the amorphous ethylene-propylene copolymer in the propylene polymer composition of the present invention is in the range of from 30 to 35% by weight.

The content of the amorphous copolymer of less than 30% by weight causes the resultant shaped article to exhibit an unsatisfactory Izot impact strength of less than 30 kg·cm/cm and a poor lacquer-retaining percentage of less than 100 in the cross cut test. A content of the amorphous copolymer of more than 35% by weight results in an unsatisfactory modulus of elasticity in bending of less than 8000 kg/cm$^2$, of the resultant shaped article.

The talc contained in the propylene polymer composition of the present invention is in the form of fine particles having an average size of from 0.5 to 5 microns. If the avarage size is less than 0.5 microns, it is difficult to uniformly disperse the talc particles in a matrix comprising the crystalline block copolymer and the amorphous copolymer by means of kneading. Also, an average size of more than 5 microns causes the resultant shaped article to exhibit an unsatisfactory lacquer-remaining percentage of less than 100 in the cross cut test.

The amount of the talc in the propylene polymer composition comprising a mixture of the crystalline block copolymer with the amorphous copolymer, is in the range of from 5 to 15% by weight. When the content of talc is less than 5% by weight, the resultant shaped article exhibits an unsatisfactory rigidity. If the content of talc is more than 15% by weight, the resultant shaped article exhibits an unsatisfactory Izot impact strength of less than 30 kg·cm/cm. Conventional types of talc may be used for the present invention without pretreating. Otherwise, the talc particles may be coated with at least one member selected from organic titanate type coupling agents, silane type coupling agents, fatty acids, fatty acid metal salts and fatty acid esters, to enhance the bonding property of the talc particles with the matrix consisting of the crystalline block copolymer and the amorphous copolymer and the dispersing property of the talc particles in the matrix.

In the preparation of the propylene polymer composition of the present invention, the crystalline block copolymer, the amorphous copolymer and the talc are mixed at an elevated temperature of, for example, 170° to 200° C. by using a mixer or kneader, for example, Bumbury's mixer or FCM, preferably, Bumbury's mixer.

The composition of the present invention may contain a small amount of one or more additives, for example, an anti-oxidant, an ultra violet ray-absorbing agent, a flame retardant, a pigment, an agent for enhancing lacquer-bonding property, a plasticizer, a lubricant and an anti-static agent.

The anti-oxidant may consist of at least one member selected from the group consisting of 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3.5-tert-butylanilino)-2,4-bis-octyl-thio-1,3,5-triazine, n-octadecyl-3-(4'-hydroxy-3'5'-di-tert-butylphenyl)propionate, 2,6-di-tert-butyl-4-methylphenol(BHT), tris-(2-methyl-4-hydroxy-5-tert-butylphenyl)butane, tetrakis-[methylene 3-(3′,5′-di-tert-butyl-4′-hydroxyphenyl)propionate]methane, 1,3,5-trimethyl-2,4,6-tris(3.5-di-tert-butyl-4-hydroxybenzyl)benzene, and dilaurylthiodipropionate.

The ultra violet ray-absorbing agent may consist of at least one member selected from the group consisting of 2-hydroxy-4-n-octoxybenzophenone, 2-hydroxy-4-octadecyloxybenzophenone, 4-dodecyloxy-2-hydroxybenzophenone, 2-hydroxy-4-n-octoxybenzophenone, 2-(2′-hydroxy-3′-tert-butyl-5′-methylphenyl)-5-chlorobenzotriazole, 2-(2′-hydroxy-3′5′-di-tert-butylphenyl)-5-chlorobenzotriazole and bis(2,6-dimethyl-4-piperidyl)sebacate.

The flame retardant may consist of at least one member selected from the group consisting of antimony trioxide, tricresyl phosphate, halogenated alkyltriazines, decabromodiphenyl ether and chlorinated polyethylenes.

The pigment includes carbon black and titanium dioxide. Magnesium benzoate is effective as an agent for enhancing the lacquer-bonding property of the propylene polymer composition.

The plasticizer may consist of a process oil, and the lubricant may consist of one or more fatty acid metal salts.

Also, the antistatic agent may be a polyoxyethylene alkylether.

The bumpers can be produced by a conventional shaping process, for example, an injection molding process, from the propylene polymer composition of the present invention. The resultant bumpers exhibit an excellent rigidity, resistance to impact at a low temperature, resistance to thermal deformation and lacquer-bonding property.

The specific examples presented below will serve to more fully elaborate how the present invention is practiced. However, it should be understood that these examples are only illustrative and in no way limit the scope of the present invention.

In the examples, the melt flow index was determined in accordance with ASTM D 1238, modulus of elasticity in bending in accordance with ASTM D 790, Izot impact strength in accordance with ASTM D 256, and temperature of thermal deformation under a load of 4.6 kg/cm$^2$ in accordance with ASTM D 648.

EXAMPLE 1

A propylene polymer composition was prepared by mixing 50 parts by weight of a crystalline ethylene-propylene block copolymer, which will be represented by EP copolymer A hereinafter, in which the content of the polymerized ethylene was 7.5% by weight, in which the content of a fraction of the polypropylene component, being insoluble in boiling n-heptane is 97% by weight or more, in which the intrinsic viscosity of a fraction of the EP copolymer A, being soluble in p-xylene at ambient temperature, was 3.7 determined in decahydronaphthalene at 135° C. and which has a melt flow index of 9 and a temperature of thermal deformation of 95° C.; 10 parts by weight of another crystalline ethylene-propylene block copolymer, which will be represented by EP copolymer B hereinafter, in which the content of the polymerized ethylene was 7.5% of weight, in which the content of a fraction of the polypropylene component, being insoluble in boiling n-heptane is 97% by weight or more, in which the intrinsic viscosity of a fraction of the EP copolymer B, being soluble in p-xylene at ambient temperature, was 3.7 determined in decahydronaphthalene at 135° C. and which has a melt flow index of 3.0 and a temperature of thermal deformation of 96° C.; 30 parts by weight of an amorphous ethylene-propylene copolymer, which will be represented by EPR hereinafter, which had an intrinsic viscosity of 2.7 determined in decahydronaphthalene at 135° C. and a Mooney viscosity $ML_{1+4}$ (100° C.) of about 70 and which contained about 70% by weight of polymerized ethylene; 0.05 parts by weight of BHT; 0.2 parts by weight of bis(2,6-dimethyl-4-piperidyl)sebacate and 10 parts by weight of talc in the form of fine particles having an average size of 2 microns, by using a Bumbury's mixer at a temperature of 180° C. for 12 minutes.

The resultant mixture was pelletized into pellets having a thickness of 3 mm and a length of 4 mm.

100 parts by weight of the pellets were mixed with 0.6 parts by weight of carbon black and the resultant mixture was melted in a monoaxial extruder, extruded through extruding holes and the extruded mixture was pelletized into granules having a diameter of 2 mm and a length of 4 mm. The granules were converted into specimens for the measurements of the modulus of elasticity in bending and the Izot impact strength and the lacquer-retaining percentage by the cross cut method.

The cross cut test was carried out in such a manner that a specimen was coated with an under coating layer formed from a two liquid type acrylic-chlorinated polypropylene coating material and having a thickness of 10 microns and, then, coated with an over coating layer having a thickness of 20 microns and formed from a two-liquid type acrylic-urethane coating material. The under and over coating layers were dried at a temperature of 80° C. for 30 minutes and, then, allowed to stand at ambient temperature for 40 hours. A lacquer coating layer was formed on the surface of the specimen. The lacquer coating layer was cut by using a multi-cross cutter to form 100 squares having a length of 1 mm and a width of 1 mm. An adhesive sheet was adhered onto the surface of the cross-cut lacquer layer and rapidly pulled up at an angle of 45 degrees to the lacquer layer surface. These procedures were repeated twice. The number of the squares retained on the specimen was counted. The degree of the lacquer-bonding property of the specimen was represented by a percentage of the retained squares to 100 squares.

Also, the melt flow index of the granulated mixture of the propylene polymer composition with carbon black was measured.

The results of the measurements are indicated in Table 1.

EXAMPLES 2 THROUGH 4

In each of the Examples 2 through 4, the same procedures as those described in Example 1 were carried out, except that the EP copolymer A, the EP copolymer B, the EPR and the talc were used in amounts as indicated in Table 1.

The results are indicated in Table 1.

TABLE 1

| Item | Example No. | 1 | 2 | 3 | 4 |
|---|---|---|---|---|---|
| | EP copolymer A | 50 | 50 | 50 | 55 |

TABLE 1-continued

| Item | Example No. | 1 | 2 | 3 | 4 |
|---|---|---|---|---|---|
| Composition | EP copolymer B | 10 | 15 | 7.5 | 0 |
| (part by weight) | EPR | 30 | 30 | 32.5 | 35 |
| | Talc | 10 | 5 | 10 | 10 |
| Melt flow index (g/10 min.) | | 4.4 | 4.1 | 4.3 | 4.2 |
| Modulus of elasticity in bending (kg/cm$^2$) | | 10400 | 10000 | 9400 | 8800 |
| Izot impact strength | 23° C. | >60 | >60 | >60 | >60 |
| (kg cm/cm)* | −30° C. | 43 | >60 | 51 | >60 |
| Temperature (°C.) of thermal deformation under a load of 4.6 Kg/cm$^2$ | | 92 | 91 | 90 | 88 |
| Lacquer-bonding property (percent of remaining lacquer) | | 100 | 100 | 100 | 100 |
| General evaluation | | Satisfactory | Satisfactory | Satisfactory | Satisfactory |

Note:
*The specimen used had a notch.

COMPARATIVE EXAMPLES 1 THROUGH 4

In each of the Comparative Examples 1 through 3, procedures identical to those described in Example 1 were carried out, except for the EP copolymer A, the EP copolymer B, the EPR and the talc were used in amounts as indicated in Table 2.

In Comparison Example 4, the same procedures as those described in Example 1 were carried out, except that the EP copolymers A and B were replaced by a crystalline propylene homopolymer which will be represented by PP homopolymer hereinafter, which contained 97% by weight or more of a fraction thereof insoluble in boiling n-heptane and had a melt flow index of 9 and in which a fraction thereof soluble in p-xylene at ambient temperature had an intrinsic viscosity of 2.0 determined in decahydronaphthalene at 135° C., and the PP homopolymer, the EPR and the talc were used in amounts as indicated in Table 2.

The results are indicated in Table 2.

TABLE 2

| Item | Comparative Example No. | 1 | 2 | 3 | 4 |
|---|---|---|---|---|---|
| | EP copolymer A | 60 | 35 | 30 | — |
| Composition | EP copolymer B | 10 | 15 | 35 | — |
| (part by weight) | PP homopolymer | — | — | — | 60 |
| | EPR | 30 | 30 | 25 | 30 |
| | Talc | 0 | 20 | 10 | 10 |
| Melt flow index (g/10 min.) | | 4.6 | 3.2 | 4.3 | 4.7 |
| Modulus of elasticity in bending (kg/cm$^2$) | | 7200 | 11400 | 11500 | 12000 |
| Izot impact strength | 23° C. | <60 | <60 | 40 | 35 |
| (kg cm/cm)* | −30° C. | >60 | 25 | 8 | 6 |
| Lacquer-bonding property (percent of remaining lacquer) | | 60 ~ 80 | 90 | 95 | 70 |
| General evaluation | | Unsatisfactory | Unsatisfactory | Unsatisfactory | Unsatisfactory |

Note:
*The specimen used had a notch.

We claim:

1. A propylene polymer composition useful for bumpers, comprising
   (A) 55 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane, in an amount of 97% or more based on the weight of said polypropylene component, in which a fraction thereof soluble in p-xylene at room temperature, has an intrinsic viscosity of from 3 to 4 determined in decahydronaphthalene at a temperature of 135° C. and which has a melt flow index of from 2 to 10;
   (B) 30 to 35% by weight of at least one amorphous ethylene-propylene copolymer having an intrinsic viscosity of from 2.0 to 3.5 determined in decahydronaphthalene at a temperature of 135° C., and a Mooney viscosity ML$_{1+4}$ of from 40 to 100 determined at a temperature of 100° C., and;
   (C) 5 to 15% by weight of talc in the form of fine particles having an average size of from 0.5 to 5 microns.

2. The composition of claim 1 wherein the talc particles may be coated with at least one member selected from organic titanate coupling agents, silane coupling agents, fatty acids, fatty acid metal salts and fatty acid esters.

3. The composition of claim 1 further comprising at least one compound selected from anti-oxidants, ultraviolet ray absorbing agents, flame retardants, pigments, lacquer-bonding enhancers, plasticizers, lubricants and anti-static agents.

4. The composition of claim 3 wherein said anti-oxidants are selected from the group consisting of 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylanilino)-2,4-bis-octyl-thio-1,3,5-triazine, n-octadecyl-3-(4'-hydroxy-3,'5', -di-tert-butylphenyl)propionate, 2,6-di-tert-butyl-4-methylphenol (BHT), tris-(2-methyl-4-hydroxy-5-tert-butylphenyl)butane, tetrakis-[methylene 3-(3',5'-di-tert-butyl-4'-hydroxyphenyl)propionate]methane, 1,3,5-trimethyl-2,4,6-tris(3,5-di-tert-butyl-4-hydroxybenzyl)benzene, and dilaurylthiodipropionate.

5. The composition of claim 3 wherein said ultraviolet ray absorbing agents are selected from the group consisting of 2-hydroxy-4-n-octoxybenzophenone, 2-hydroxy-4-octadecyloxy-benzophenone, 4-dodecyloxy-2-hydroxybenzophenone, 2-hydroxy-4-n-octoxybenzophenone, 2-(2'-hydroxy-3'-tert-butyl-5'-methylphenyl)-5-chlorobenzotriazole, 2-(2'hydroxy-3'5'-di-tert-butylphenyl)-5-chloro-benzotriazole and bis(2,6-dimethyl-4-piperidyl)sebacate.

6. The composition of claim 3 wherein said flame retardants are selected from the group consisting of antimony trioxide, tricresyl phosphate, halogenated alkyltriazines, decabromodiphenyl ether and chlorinated polyethylenes.

7. The composition of claim 3 wherein said pigments are selected from the group consisting of carbon black and titanium dioxide.

8. The composition of claim 3 wherein said lacquer-bonding enhancer is magnesium benzoate.

9. The composition of claim 3 wherein said plasticizer is a process oil.

10. The composition of claim 3 wherein said lubricant is a fatty acid metal salt.

11. The composition of claim 3 wherein said antistatic agent is a polyoxyethylene alkylether.

* * * * *